United States Patent [19]

Fujimoto et al.

[11] Patent Number: 5,589,950
[45] Date of Patent: Dec. 31, 1996

[54] IMAGE FORMING APPARATUS THAT CORRECTS INPUT GRAY LEVEL-OUTPUT GRAY LEVEL CHARACTERISTIC DATA SUCH THAT OUTPUT GRAY LEVELS GRADUALLY INCREASE WITH HIGHER INPUT GRAY LEVELS NEAR A BOUNDARY

[75] Inventors: Masaya Fujimoto; Haruo Yamamoto, both of Osaka, Japan

[73] Assignee: Mita Industrial, Co. Ltd., Osaka, Japan

[21] Appl. No.: 352,088

[22] Filed: Nov. 30, 1994

[30] Foreign Application Priority Data

Dec. 3, 1993 [JP] Japan ................... 5-339496

[51] Int. Cl.$^6$ ................. H04N 1/40; H04N 1/46
[52] U.S. Cl. ............ 358/455; 358/523; 358/524; 358/525; 358/534
[58] Field of Search .................. 358/455, 456, 358/457, 518, 521, 522, 534, 530, 523, 524, 525; H04N 1/40, 1/46

[56] References Cited

U.S. PATENT DOCUMENTS

| 4,410,909 | 10/1983 | Ueda et al. | 358/521 |
|---|---|---|---|
| 4,805,013 | 2/1989 | Dei et al. | 358/519 |
| 5,077,158 | 12/1991 | Nakano | 430/45 |
| 5,164,822 | 11/1992 | Muramatsu | 358/501 |
| 5,189,521 | 2/1993 | Ohtsubo | 358/296 |
| 5,398,109 | 3/1995 | Amakawa et al. | 358/517 |
| 5,422,738 | 6/1995 | Ishihara | 358/523 |
| 5,422,740 | 6/1995 | Fujimoto | 358/521 |

Primary Examiner—Kim Vu
Assistant Examiner—Madeleine Anh-Vinh Nguyen
Attorney, Agent, or Firm—Beveridge, DeGrandi, Weilacher & Young, LLP

[57] ABSTRACT

In an image forming apparatus according to the present invention, characteristic correcting data for correcting input gray level-output gray level characteristics for each of a plurality of steps into which input gray levels are divided is inputted by an inputting device. At the time of image formation processing, input gray level-output gray level characteristic data are corrected on the basis of the characteristic correcting data inputted by the inputting device. Further, when there occurs at the boundary between adjacent steps such a reversal phenomenon that an output gray level in the step having relatively low input gray levels is higher than an output gray level in the step having relatively high input gray levels in input gray level-output gray level characteristic data obtained by correction using a correcting device, the input gray level-output gray level characteristic data are so corrected that output gray levels gradually increase with higher input gray levels in the vicinity of the boundary.

8 Claims, 11 Drawing Sheets

IMAGE FORMING APPARATUS THAT CORRECTS INPUT GRAY LEVEL-OUTPUT GRAY LEVEL CHARACTERISTIC DATA SUCH THAT OUTPUT GRAY LEVELS GRADUALLY INCREASE WITH HIGHER INPUT GRAY LEVELS NEAR A BOUNDARY

BACKGROUND OF THE INVENTION

1. Field of the Invention

The present invention relates to a density processing method in an image forming apparatus such as a copying machine.

2. Description of the Prior Art

In a digital color copying machine, a document is first irradiated by an exposure lamp in a scanner section, and its reflected light is detected by a CCD (Charge Coupled Device) and sequentially converted into an electric signal. In this case, an image of the document is separated for each color and for each pixel by the CCD into an electric signal corresponding to the density of each pixel. This electric signal is sent to an image processing section.

In the image processing section, an output of the CCD is digitally converted and then, the variations of the CCD, the exposure lamp and the like are corrected for each signal having each color (B (blue), G (green) or R (red)) in a shading correcting section. Signals having respective colors (BGR signals) are converted into toner density signals (YMC (yellow, magenta and cyan) signals) in a BGR-YMC converting section. In addition, a BK (black) signal is produced from the YMC signals in a BK producing section.

Thereafter, in the YMC signals and the BK signals, the density levels of the respective colors are corrected in accordance with the characteristics of a filter and toner in a color correcting section. Furthermore, color conversion of a designated color is performed in a color converting section, and processing, such as trimming or masking, is performed in a synthesis processing section. Thereafter, in a density processing section, the level of a digital density signal sent is converted depending on a developing color, the copy density designated in an operating section, the type of document image designated in the operating section, and the like. Thereafter, the digital density signal is sent to a printer section through a variable magnification and movement processing section for performing variable magnification and movement processing in the main scanning direction of an image, to accomplish recording on paper.

Meanwhile, in the digital copying machine or the digital color copying machine, density processing using a dither method has been generally performed in the density processing section so as to obtain a gray scale image. A digital color copying machine already developed by the applicant of the present application is so adapted that characteristic data representing a gray level of a recording pixel relative to a gray level of a reading pixel (hereinafter referred to as input gray level-output gray level characteristic data) have been previously generated using a dither matrix having 2×2 pixels as one block and stored in a memory device, to find data representing a gray level of a recording pixel (hereinafter referred to as output gray level data) corresponding to data representing a gray level of a reading pixel (hereinafter referred to as input gray level data) inputted on the basis of the input gray level-output gray level characteristic data. There are 256 gray levels of the reading pixel, and there are 64 gray levels of the recording pixel. A density processing section in this copying machine is shown in FIG. 4.

The density processing section 10 comprises an address generating circuit 101 and a table memory 102 and is controlled by a CPU 20. The CPU 20 comprises a ROM 21 and RAMs 22 and 23. A plurality of types of input gray level-output gray level characteristic data previously generated are stored in the ROM 21 depending on a developing color (M, C, Y or BK), the copy density designated in the operating section, and the type of document image designated in the operating section.

The CPU 20 transfers one type of input gray level-output gray level characteristic data corresponding to the developing color, and the copy density and the type of document image designated in the operating section out of the plurality of types of input gray level-output gray level characteristic data from the data ROM 21 to the table memory 102. Input gray level data and a signal representing the position of the reading pixel (hereinafter referred to as a pixel position signal) comprising a line signal HSYNC and a dot signal CLK (not shown) are sent to the address generating circuit 101. The address generating circuit 101 outputs a signal for specifying an address storing output gray level data corresponding to the input gray level data and the pixel position signal sent (a pixel in the dither matrix which corresponds to the reading pixel) out of addresses in the table memory 102. Consequently, the output gray level data stored at the specified address is outputted from the table memory 102.

Input gray level-output gray level characteristics are subtly changed in many cases even if copying machines are of the same type. In order to provide characteristics suitable for all the copying machines, the input gray level-output gray level characteristics must be corrected for each copying machine.

SUMMARY OF THE INVENTION

A first object of the present invention is to provide an image forming apparatus capable of correcting input gray level-output gray level characteristics for each image forming apparatus such that the input gray level-output gray level characteristics become characteristics suitable for each image forming apparatus.

A second object of the present invention is to provide an image forming apparatus capable of graphing input gray level-output gray level characteristics and generating a graph corresponding to the input gray level-output gray level characteristics.

A first image forming apparatus according to the present invention is characterized by comprising first storing means for storing input gray level-output gray level characteristic data which represent an output gray level relative to an input gray level, a density processing section which receives input gray level-output gray level characteristic data from the first storing means, the density processing section including second storing means for storing input gray level-output gray level characteristic data transferred from the first storing means, and address generating means for generating addresses corresponding to the second storing means in response to input gray level data, the second storing means and the address generating means cooperating to supply output gray level data from an address in the second storing means when the address is specified by the address generating means, inputting means for inputting characteristic correcting data, the characteristic correcting data providing input gray level-output gray level corrections corresponding to a plurality of division steps into which input gray levels are divided, correcting means for correcting input gray level-output gray level characteristic data stored in the first storing means on the basis of characteristic correcting data supplied by the inputting means, and reversal phenomenon correcting means for correcting, when there occurs at the boundary between adjacent steps such a reversal phenomenon that an output gray level in the step having relatively low input gray levels is higher than an output gray level in the step having relatively high input gray levels in input gray level-output gray level characteristic data obtained by the correction using the correcting means, the input gray level-output gray level characteristic data so that output gray levels gradually increase with higher input gray levels in the vicinity of the boundary.

In the first image forming apparatus according to the present invention, the characteristic correcting data for correcting the input gray level-output gray level characteristics for each of the plurality of steps into which the input gray levels are divided is inputted by the inputting means. At the time of image formation processing, the input gray level-output gray level characteristic data are corrected on the basis of the characteristic correcting data inputted by the inputting means.

Furthermore, when there occurs at the boundary between adjacent steps such a reversal phenomenon that an output gray level in the step having relatively low input gray levels is higher than an output gray level in the step having relatively high input gray levels in input gray level-output gray level characteristic data obtained by the correction using the correcting means, the input gray level-output gray level characteristic data is so corrected that output gray levels gradually increase with higher input gray levels in the vicinity of the boundary.

Consequently, the input gray level-output gray level characteristics can be corrected for each image forming apparatus so that the input gray level-output gray level characteristics become characteristics suitable for each image forming apparatus.

When the reversal phenomenon occurs in the vicinity of the boundary between the adjacent steps in the input gray level-output gray level characteristic data by and after the correction using the correcting means, it is preferable to provide means for graphing the input gray level-output gray level characteristic data after correcting the reversal phenomenon by the reversal phenomenon correcting means and generating a graph corresponding to the input gray level-output gray level characteristic data.

A second image forming apparatus according to the present invention is characterized by comprising first storing means for storing input gray level-output gray level characteristic data which represent an output gray level relative to an input gray level, a density processing section which receives input gray level-output gray level characteristic data from the first storing means, the density processing section including second storing means for storing input gray level-output gray level characteristic data transferred from the first storing means, and address generating means for generating addresses corresponding to the second storing means in response to input gray level data, the second storing means and the address generating means cooperating to supply output gray level data from an address in the second storing means when the address is specified by the address generating means, inputting means for inputting characteristic correcting data, the characteristic correcting data providing input gray level-output gray level corrections corresponding to a plurality of division steps into which input gray levels are divided, correcting means for correcting input gray level-output gray level characteristic data stored in the first storing means on the basis of characteristic correcting data supplied by the inputting means, and jump-up phenomenon correcting means for correcting, when there occurs at the boundary between adjacent steps such a jump-up phenomenon that an output gray level in the step having relatively low input gray levels rapidly increases to an output gray level in the step having relatively high input gray levels in input gray level-output gray level characteristic data obtained by the correction using the correcting means, the input gray level-output gray level characteristic data so that output gray levels gradually increase with higher input gray levels in the vicinity of the boundary.

In the second image forming apparatus according to the present invention, the characteristic correcting data for correcting the input gray level-output gray level characteristics for each of the plurality of steps into which the input gray levels are divided is inputted by the inputting means. At the time of image formation processing, the input gray level-output gray level characteristic data are corrected on the basis of the characteristic correcting data inputted by the inputting means.

Furthermore, when there occurs at the boundary between adjacent steps such a jump-up phenomenon that an output gray level in the step having relatively low input gray levels rapidly increases to an output gray level in the step having relatively high input gray levels in input gray level-output gray level characteristic data obtained by the correction using the correcting means, the input gray level-output gray level characteristic data is so corrected that output gray levels gradually increase with higher input gray levels in the vicinity of the boundary.

Consequently, the input gray level-output gray level characteristics can be corrected for each image forming apparatus so that the input gray level-output gray level characteristics become characteristics suitable for each image forming apparatus.

When the jump-up phenomenon occurs at the boundary between the adjacent steps in the input gray level-output gray level characteristic data by and after the correction using the correcting means, it is preferable to provide means for graphing the input-output gray level characteristic data after correcting the jump-up phenomenon by the jump-up phenomenon correcting means and generating a graph corresponding to the input gray level-output gray level characteristic data.

A third image forming apparatus according to the present invention is characterized by comprising first storing means for storing input gray level-output gray level characteristic data which represent an output gray level relative to an input gray level, a density processing section which receives input gray level-output gray level characteristic data from the first storing means, the density processing section including second storing means for storing input gray level-output gray level characteristic data transferred from the first storing means, and address generating means for generating addresses corresponding to the second storing means in response to input gray level data, the second storing means and the address generating means cooperating to supply output gray level data from an address in the second storing means when the address is specified by the address generating means, inputting means for inputting characteristic correcting data, the characteristic correcting data providing input gray level-output gray level corrections corresponding to a plurality of division steps into which input gray levels are divided, correcting means for correcting the input gray level-output gray level characteristic data stored in the first storing means on the basis of characteristic correcting data supplied by the inputting means, reversal phenomenon correcting means for correcting, when there occurs at the boundary between adjacent steps such a reversal phenomenon that an output gray level in the step having relatively low input gray levels is higher than an output gray level in the step having relatively high input gray levels in input gray level-output gray level characteristic data obtained by the correction using the correcting means, the input gray level-output gray level characteristic data so that output gray levels gradually increase with higher input gray levels in the vicinity of the boundary, and jump-up phenomenon correcting means for correcting, when there occurs at the boundary between adjacent steps such a jump-up phenomenon that an output gray level in the step having relatively low input gray levels rapidly increases to an output gray level in the step having relatively high input gray levels in input gray level-output gray level characteristic data obtained by the correction using the correcting means, the input gray level-output gray level characteristic data so that output gray levels gradually increase with higher input gray levels in the vicinity of the boundary.

In the third image forming apparatus according to the present invention, the characteristic correcting data for correcting the input gray level-output gray level characteristics for each of the plurality of steps into which the input gray levels are divided is inputted by the inputting means. At the time of image formation processing, the input gray level-output gray level characteristic data are corrected on the basis of the characteristic correcting data inputted by the inputting means.

Furthermore, when there occurs at the boundary between adjacent steps such a reversal phenomenon that an output gray level in the step having relatively low input gray levels is higher than an output gray level in the step having relatively high input gray levels in input gray level-output gray level characteristic data obtained by the correction using the correcting means, the input gray level-output gray level characteristic data is so corrected that output gray levels gradually increase with higher input gray levels in the vicinity of the boundary.

Furthermore, when there occurs at the boundary between adjacent steps such a jump-up phenomenon that an output gray level in the step having relatively low input gray levels rapidly increases to an output gray level in the step having relatively high input gray levels in input gray level-output gray level characteristic data obtained by the correction using the correcting means, the input gray level-output gray level characteristic data is so corrected that output gray levels gradually increase with higher input gray levels in the vicinity of the boundary.

Consequently, the input gray level-output gray level characteristics can be corrected for each image forming apparatus such that the input gray level-output gray level characteristics become characteristics suitable for each image forming apparatus.

When the reversal phenomenon occurs at the boundary between the adjacent steps and the jump-up phenomenon occurs at the boundary between the adjacent steps in the input gray level-output gray level characteristic data by and after the correction using the correcting means, it is preferable to respectively provide means for graphing the input-output gray level characteristic data after correcting the reversal phenomenon by the reversal phenomenon correcting means and correcting the jump-up phenomenon by the jump-up phenomenon correcting means and generating graphs corresponding to the input gray level-output gray level characteristic data.

Examples of the reversal phenomenon correcting means in the first image forming apparatus or the third image forming apparatus include one comprising means for finding data of a point A at which a boundary line between the adjacent steps at which the reversal phenomenon occurs and a total output gray level characteristic line corresponding to the step having relatively low input gray levels which is represented by the input gray level-output gray level characteristic data obtained by the correction using the correcting means cross each other, means for finding data of a point B at which the boundary line between the adjacent steps at which the reversal phenomenon occurs and a total output gray level characteristic line corresponding to the step having relatively high input gray levels which is represented by the input gray level-output gray level characteristic data obtained by the correction using the correcting means cross each other, finding a point C having an output gray level equal to the output gray level of the point B on the total output gray level characteristic line corresponding to the step having relatively low input gray levels which is represented by the input gray level-output gray level characteristic data obtained by the correction using the correcting means, finding a point D having an output gray level equal to the output gray level of the point A on the total output gray level characteristic line corresponding to the step having relatively high input gray levels which is represented by the input gray level-output gray level characteristic data obtained by the correction using the correcting means, and means for finding a straight line connecting the point C and the point D and changing the input gray level-output gray level characteristic data between the point C and the point D to characteristics represented by the found straight line.

Examples of the jump-up phenomenon correcting means in the second image forming apparatus or the third image forming apparatus include one comprising means for finding a level width of the step having relatively low input gray levels and a level width of the step having relatively high input gray levels out of the adjacent steps at which the jump-up phenomenon occurs, means for finding data of a point E spaced apart from a boundary line between the adjacent steps at which the jump-up phenomenon occurs by $1/\alpha$ (where $\alpha$ is a value larger than one) of the level width of the step having relatively low input gray levels in the direction of input gray levels on a total output gray level characteristic line corresponding to the step having relatively low input gray levels which is represented by the input gray level-output gray level characteristic data obtained by the correction using the correcting means, means for finding data of a point F spaced apart from the boundary line between the adjacent steps at which the jump-up phenomenon occurs by $1/\alpha$ (where $\sigma$ is a value larger than one) of the level width of the step having relatively high input gray levels in the direction of the input gray levels on a total output gray level characteristic line corresponding to the step having relatively high input gray levels which is represented by the input gray level-output gray level characteristic data obtained by the correction using the correcting means, and means for finding a straight line connecting the point E and the point F and changing the input gray level-output gray level characteristic data between the point E and the point F to characteristics represented by the found straight line.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
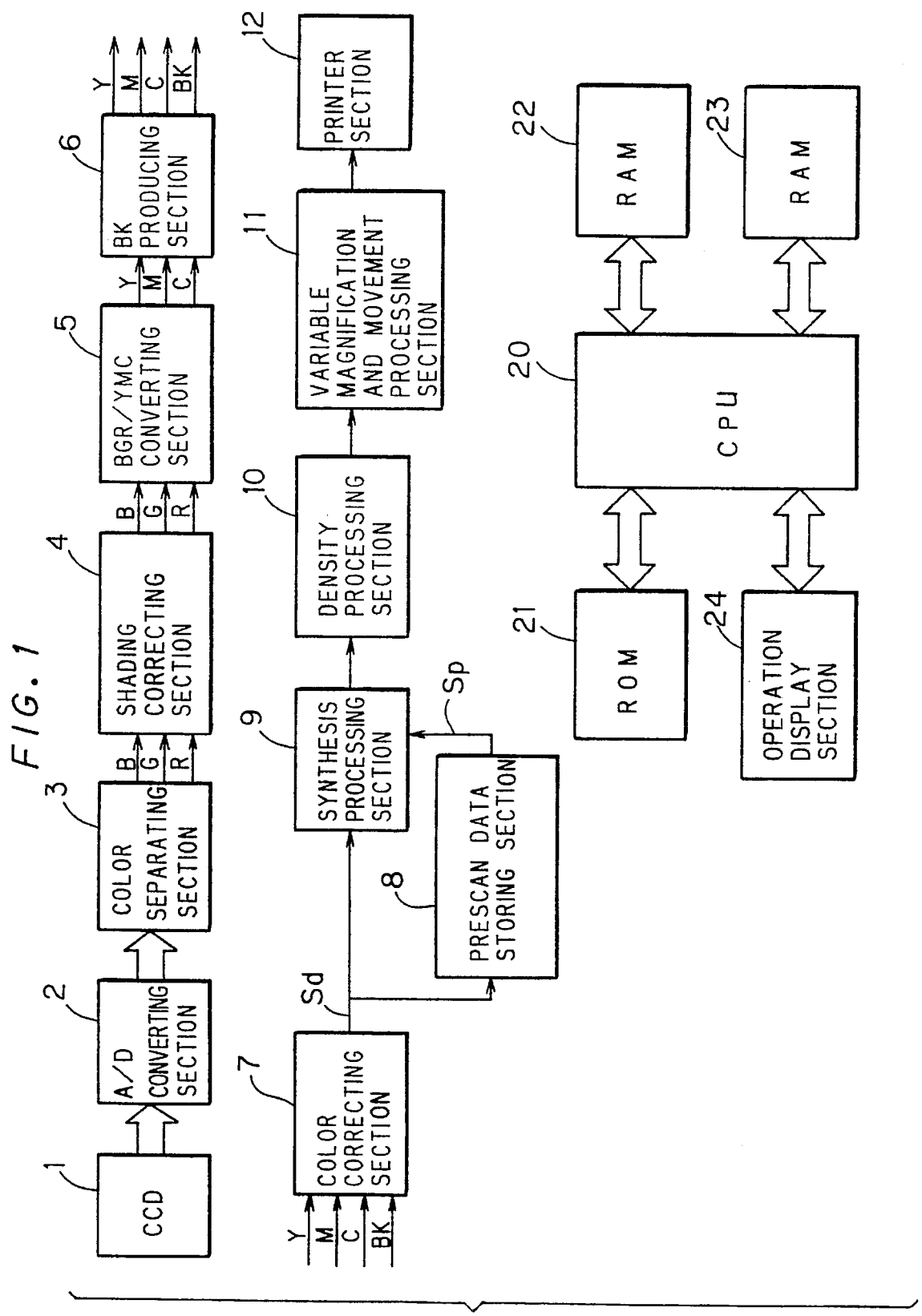
FIG. 1 is an electrical block diagram showing the entire construction of a digital color copying machine.

Referring now to the drawings, description is made of an embodiment in a case where the present invention is applied to a digital color copying machine.

FIG. 1 illustrates the entire electrical construction of a digital color copying machine.

In a digital color copying machine, a document is first irradiated by an exposure lamp in a scanner section, and its reflected light is detected by a CCD 1 and sequentially converted into an electric signal. In this case, an image of the document is separated for each color and for each pixel by the CCD 1 into an electric signal corresponding to the density of each pixel. This electric signal is sent to an image processing section.

In the image processing section, an output of the CCD 1 is digitally converted in an analog-to-digital converting section 2, and then is sent to a color separating section 3. From the color separating section 3, a density signal is outputted for each color (B, G or R). The variations of the CCD 1, the exposure lamp and the like are corrected for each signal having each color (B, G or R) in a shading correcting section 4. Signals having respective colors (BGR signals) are converted into toner density signals (YMC signals) in a BGR-YMC converting section 5. In addition, a BK signal is produced from the YMC signals in a BK producing section 6.

Thereafter, in the YMC signals and the BK signals, the density levels of the respective colors are corrected in accordance with the characteristics of a filter and toner in a color correcting section 7. In a synthesis processing section 9, processing such as trimming or masking is performed. Further, at the time of prescanning, an output of the color correcting section 7 is sent to a prescan data storing section 8 including a prescan memory 83 (see FIG. 2).

The processing such as trimming or masking is performed in the synthesis processing section 9, after which the level of a digital density signal sent is converted depending on a developing color, the copy density designated in an operating section, the type of document image designated in the operating section, and the like in a density processing section 10. Thereafter, the digital density signal is sent to a printer section 12 through a variable magnification and movement processing section 11 for performing variable magnification and movement processing in the main scanning direction of an image, to accomplish recording on paper.

The above described respective sections in the digital color copying machine are controlled by a central processing unit (CPU) 20. The CPU 20 comprises a ROM 21 for storing its program, input gray level-output gray level characteristic data and the like, a RAM 22 for storing necessary data, a RAM 23 backed up by a battery for storing characteristic correcting data for correcting input gray level-output gray level characteristic data, for example, (hereinafter referred to as a backup RAM), and an operation display section 24 for inputting information such as characteristic correcting data and displaying various information.

Figure 2:
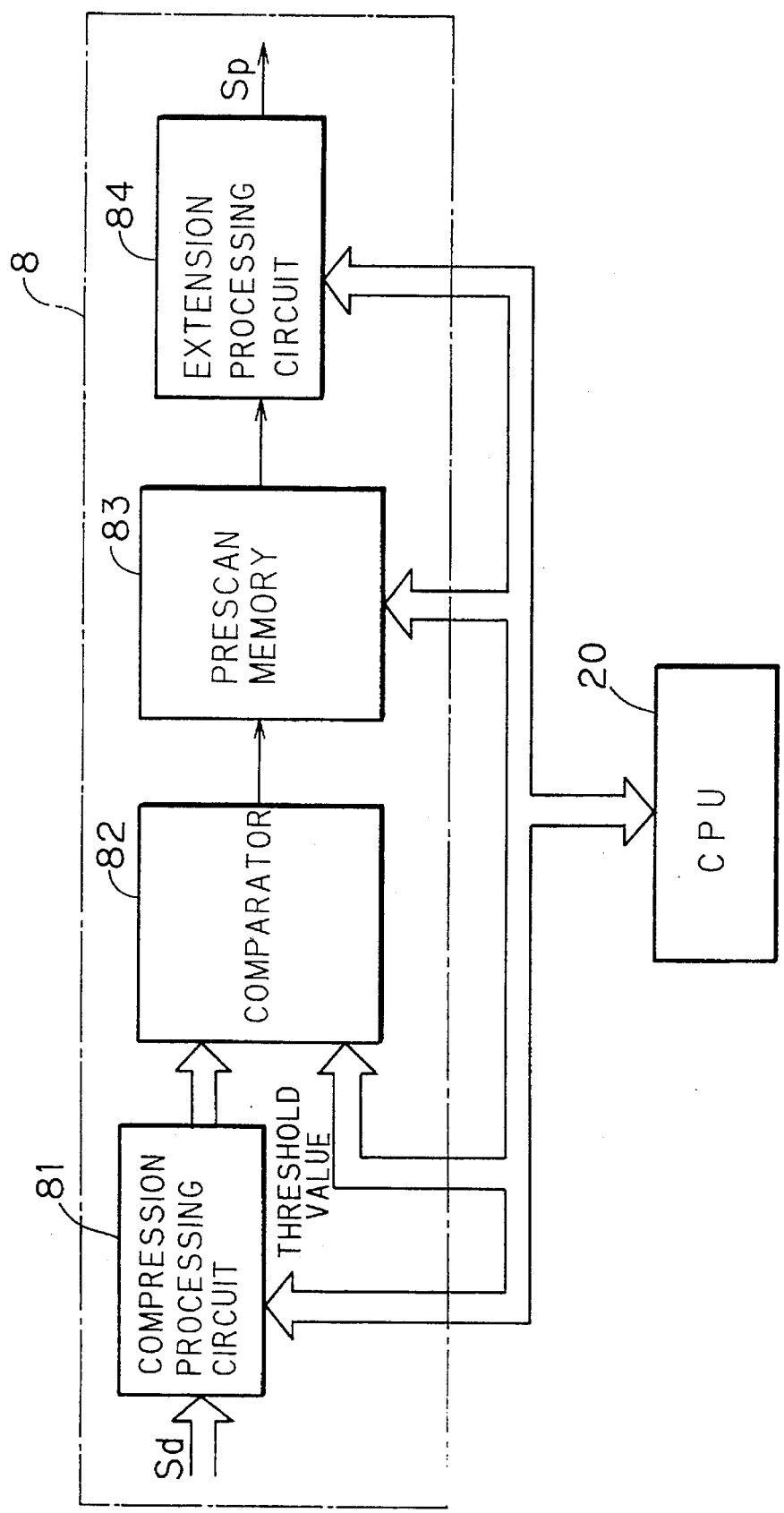
FIG. 2 is an electrical block diagram showing the construction of a prescan data storing section.

FIG. 2 illustrates the construction of the prescan data storing section 8.

A density signal Sd having each color outputted from the color correcting section 7 at the time of prescanning is thinned at a 1/N ratio, for example, at a 1/8 ratio by a compression processing circuit 81, and then is sent to a comparator 82. A lower limit threshold value and an upper limit threshold value from the CPU 20 are inputted to the comparator 82. A digital signal Sd of, for example, eight bits outputted from the color correcting section 7 is converted into a binary signal "0" or "1" on the basis of the threshold values. The binary signal obtained by the conversion is stored in a prescan memory 83.

At the time of reading out data stored in the prescan memory 83, each of the binary signals read out is outputted N times from an extension processing circuit 84 and is sent as prescan data SP to the synthesis processing section 9. The data stored in the prescan memory 83 are used for detection of document size, trimming processing, masking processing and the like. In the present embodiment, data such as input gray level-output gray level characteristic data are sent to the prescan memory 83 by the CPU 20 and stored therein, as described later.

Figure 3:
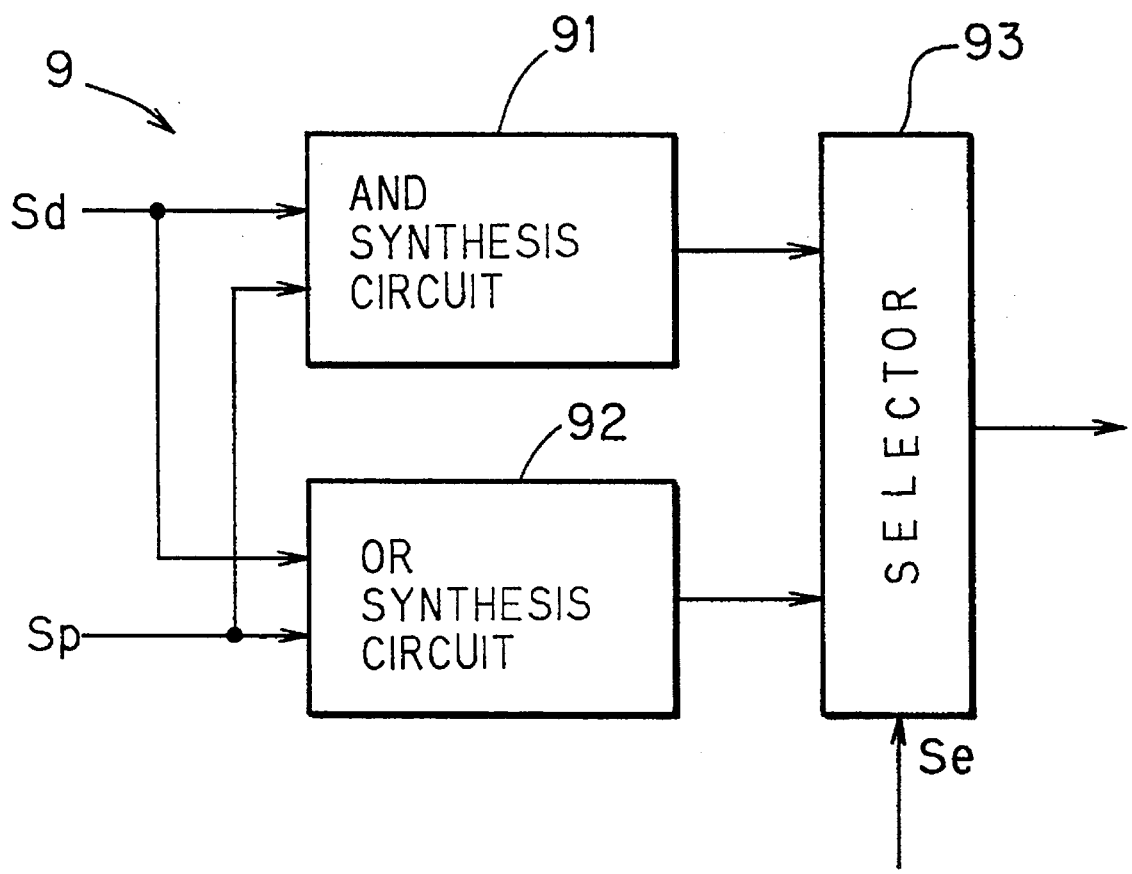
FIG. 3 is an electrical block diagram showing the construction of a synthesis processing section.

FIG. 3 illustrates the construction of the synthesis processing section 9.

The synthesis processing section 9 comprises an AND synthesis circuit 91, an OR synthesis circuit 92, and a selector 93 for selecting either one of outputs of the synthesis circuits 91 and 92 and generating the selected output on the basis of a selection signal Se from the CPU 20. An output from the color correcting section 7 (a density signal Sd) and an output from the prescan data storing section 8

(prescan data Sp) are inputted to each of the synthesis circuits 91 and 92.

The AND synthesis circuit 91 outputs the density signal Sd only when the prescan data Sp is "0". The AND synthesis circuit 91 is used for, for example, making a portion other than a document area white.

The OR synthesis circuit 92 outputs a signal corresponding to the maximum density value representing a black color when the prescan data Sp is "1" (a 8-bit signal corresponding to "255" when the density signal Sd is a 8-bit signal), while outputting the density signal Sd when the prescan data Sp is "0". When synthesis processing is performed by the OR synthesis circuit 92, the density signal Sd is controlled at the minimum density value representing a white color. When the prescan data Sp is "0", therefore, a signal representing the minimum density value "0" is outputted. The OR synthesis circuit 92 is used for, for example, causing the prescan memory 83 to store data to be synthesized such as a date or overlay data in the prescan memory 83 to record the data to be synthesized and the overlay data on paper, as already developed by the applicant of the present application and described in a patent application (Patent Application Number 69056/1991). In the present embodiment, the OR synthesis circuit 92 is used for causing the printer section 12 to record input gray level-output gray level characteristics data, as described later.

Figure 4:
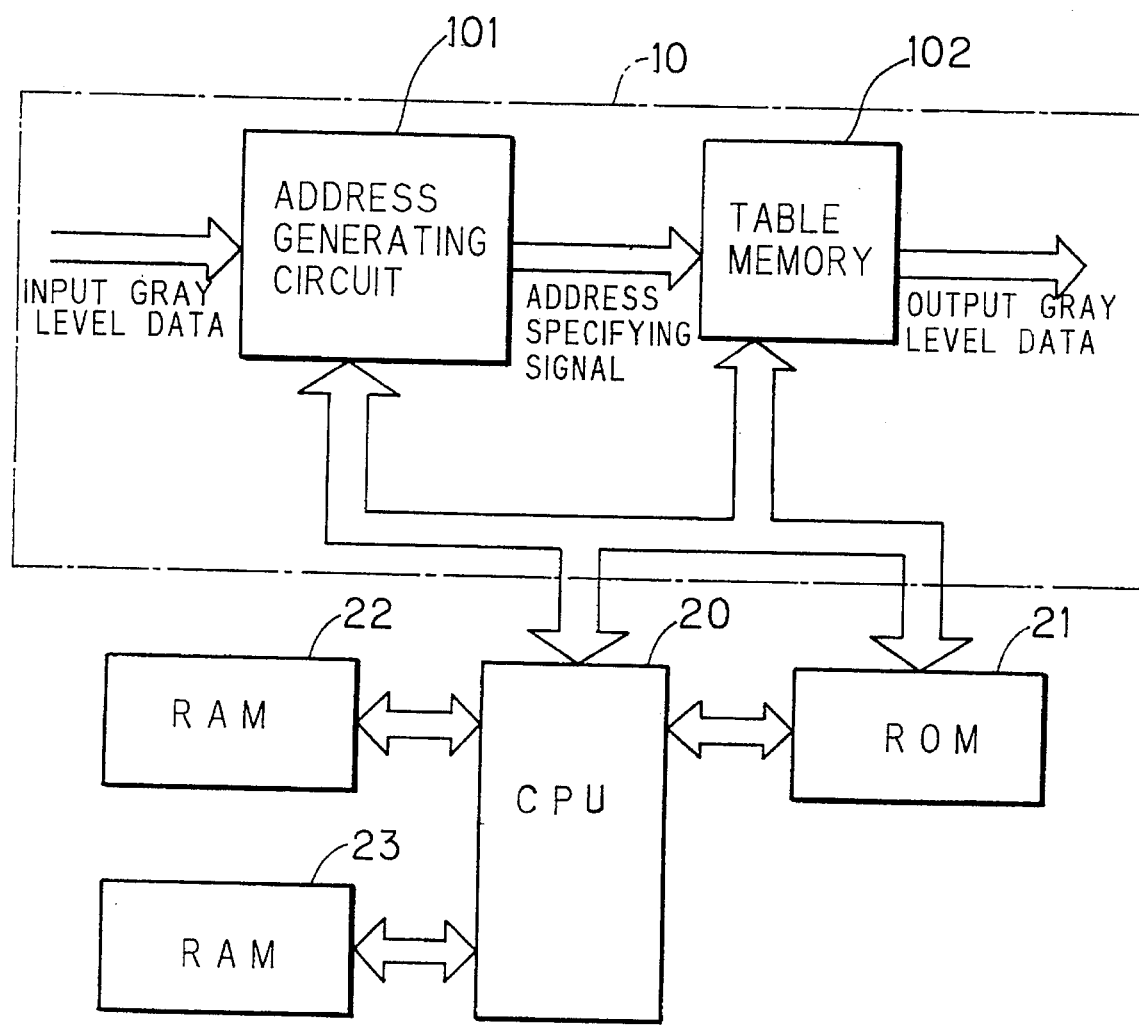
FIG. 4 is an electrical block diagram showing a density processing section.

FIG. 4 illustrates the construction of the density processing section 10.

Figure 5:
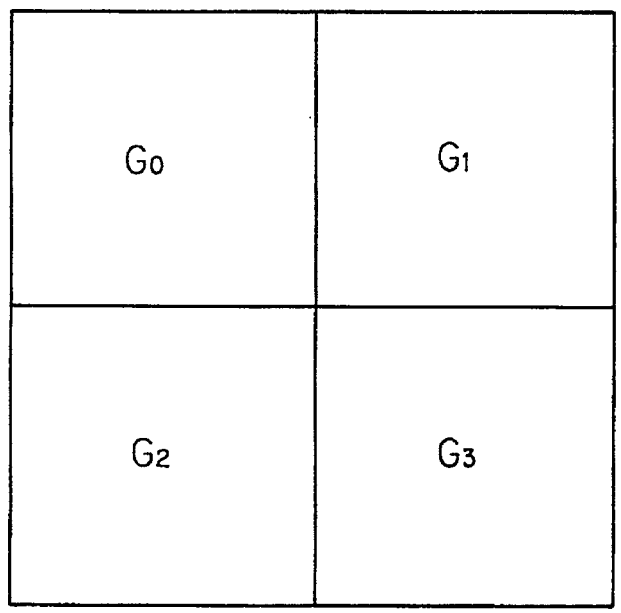
FIG. 5 is a schematic diagram showing four pixels in a dither matrix.

The density processing section 10 comprises an address generating circuit 101 and a table memory 102. A plurality of types of characteristic data representing a gray level of a recording pixel relative to a gray level of a reading pixel (input gray level-output gray level characteristic data) are stored in a ROM 21 depending on a developing color (M, C, Y or BK), the copy density designated in the operating section and the type of document image designated in the operating section. The document images are of three types, that is, a character, a photograph, and a character-photograph mixture. The input gray level-output gray level characteristic data are previously generated using a dither matrix having as one block 2×2 pixels $G_0$, $G_1$, $G_2$ and $G_3$ shown in FIG. 5. In this example, there are 256 gray levels of the reading pixel, and there are 64 gray levels of the recording pixel.

Input gray level-output gray level characteristic data corresponding to a developing color, the copy density designated in the operating section and the type of document image designated in the operating section out of the plurality of types of input gray level-output gray level characteristic data stored in the ROM 21 are transferred to the table memory 102 by the CPU 20. Data representing a gray level of a reading pixel (input gray level data) and a signal representing the position of the reading pixel (a pixel position signal) comprising a line signal HSYNC and a dot signal CLK (not shown) sent from the synthesis processing section 9 are sent to the address generating circuit 101.

The address generating circuit 101 outputs a 10-bit signal for specifying an address (hereinafter referred to as an address specifying signal) corresponding to the input gray level data and the pixel position signal (a pixel in the dither matrix which corresponds to the reading pixel). Lower eight bits of the address specifying signal correspond to the input gray levels 0 to 255, and upper two bits thereof correspond to each of the pixels $G_0$, $G_1$, $G_2$ and $G_3$ in the dither matrix. Values expressed by the upper two bits of the address specifying signal which correspond to each of the pixels $G_0$, $G_1$, $G_2$ and $G_3$ are "00", "01", "10" and "11". When the address specifying signal is outputted from the address generating circuit 101, data stored in a specified address in the table memory 102 is outputted as data representing an output gray level (output gray level data) from the table memory 102.

Table 1 shows one example of input gray level-output gray level characteristic data. In Table 1, base addresses Oadr 0 to 255 denote specified addresses used as the basis corresponding to input gray level data 0 to 255, and the base addresses Oadr 0 to 255 have a one-to-one correspondence with the input gray level data 0 to 255. In addition, a total gray level indicates the total of output gray levels corresponding to the four pixels in the dither matrix relative to an input gray level.

TABLE 1

| INPUT GRAY LEVEL DATA | BASE ADDRESS (Oadr) | OUTPUT GRAY LEVEL DATA | | | | TOTAL GRAY LEVEL |
|---|---|---|---|---|---|---|
| | | $G_0$ | $G_1$ | $G_2$ | $G_8$ | |
| 0 | 0 | 0 | 0 | 0 | 0 | 0 |
| 1 | 1 | 1 | 0 | 0 | 0 | 1 |
| 2 | 2 | 2 | 0 | 0 | 0 | 2 |
| . | . | . | . | . | . | . |
| . | . | . | . | . | . | . |
| 64 | 64 | 64 | 0 | 0 | 0 | 64 |
| 65 | 65 | 64 | 1 | 0 | 0 | 65 |
| . | . | . | . | . | . | . |
| 129 | 129 | 64 | 64 | 0 | 1 | 129 |
| . | . | . | . | . | . | . |
| 255 | 255 | 64 | 64 | 63 | 64 | 255 |

Figure 6:
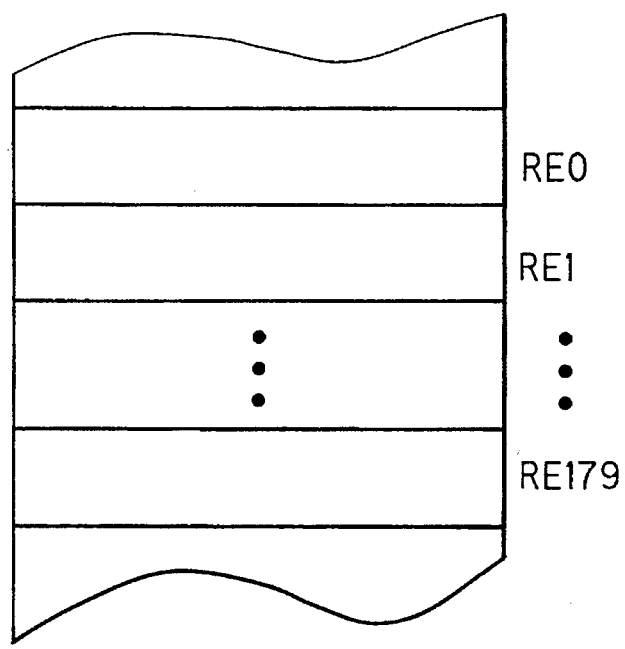
FIG. 6 is a schematic diagram showing the contents of a ROM 21.

FIG. 6 illustrates a part of the contents of the ROM 21.

In this copying machine, input gray level-output gray level characteristic data are previously generated for four types of colors (M, C, K, and BK), for 15 levels of the density designated in the operating section, and for three types of document images designated in the operating section, that is, a character, a photograph and a character-photograph mixture designated in the operating section. Specifically, 180 types of input gray level-output gray level characteristic data are respectively stored in areas $RE_0$ to $RE_{179}$ in the ROM 21.

Figure 7:
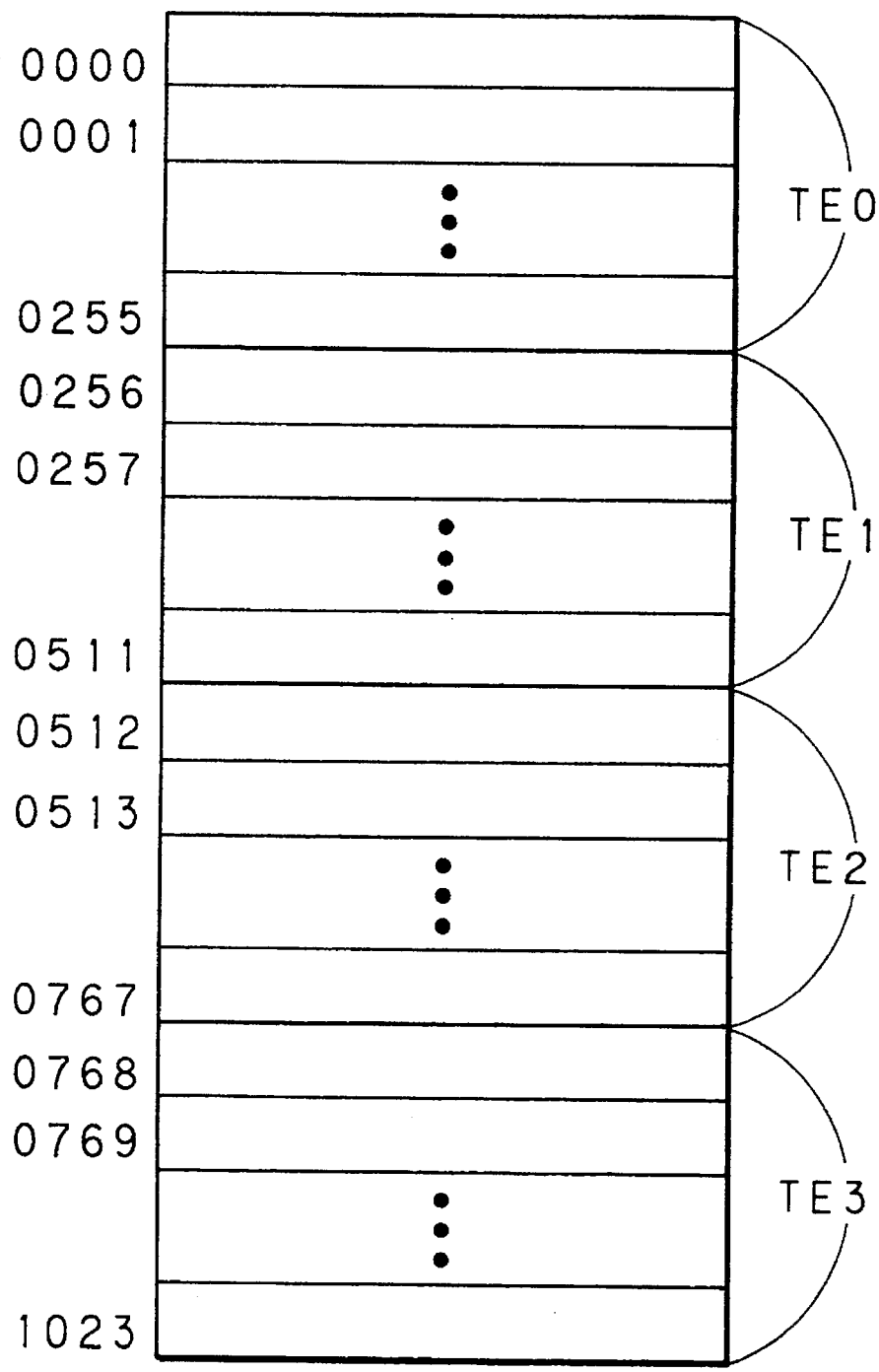
FIG. 7 is a schematic diagram showing the interior of a table memory 102.

FIG. 7 illustrates the interior of the table memory 102.

The table memory 102 is a 8-bit memory, and comprises an area $TE_0$ (addresses 0 to 255) for storing input gray level-output gray level characteristic data (256 gray levels) with respect to the pixel $G_0$ in the dither matrix, an area $TE_1$ (addresses 256 to 511) for storing input gray level-output gray level characteristic data with respect to the pixel $G_1$, an area $TE_2$ (addresses 512 to 767) for storing input gray level-output gray level characteristic data with respect to the pixel $G_2$, and an area $TE_3$ (addresses 768 to 1023) for storing input gray level-output gray level characteristic data with respect to the pixel $G_3$.

In the density processing section 10 in this copying machine, each of the input gray level-output gray level characteristic data stored in the ROM 21 is corrected on the basis of characteristic correcting data designated by the operation display section 24.

Figure 8:
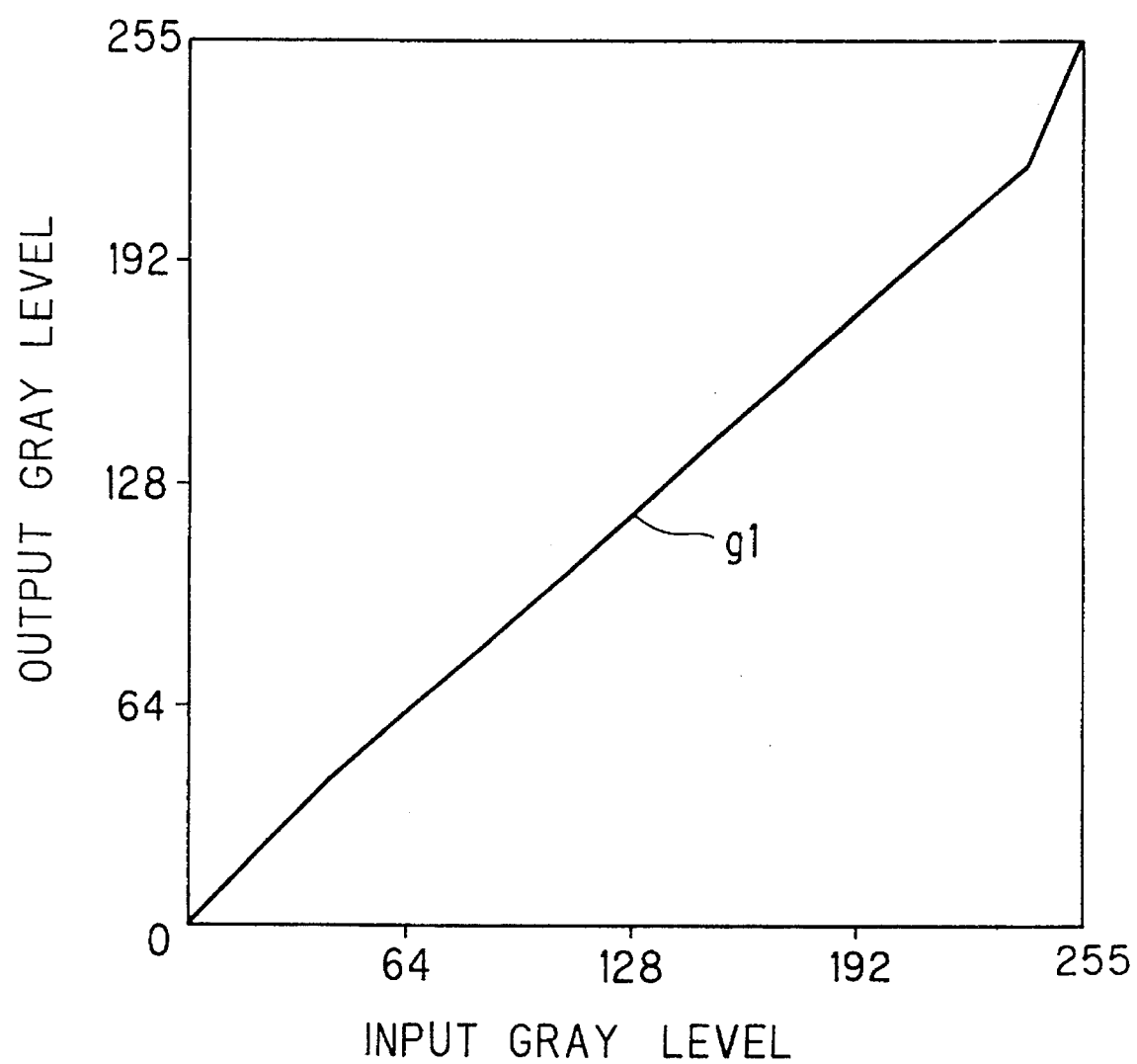
FIG. 8 is a graph showing the original input gray level-output gray level characteristic data.

Description is now made of the idea of this correction. A graph line g1 shown in FIG. 8 is obtained by graphing certain input gray level-output gray level characteristic data by using input gray levels to enter the axis of the abscissa and using total output gray levels to enter the axis of the ordinate.

In the operation display section 24, correcting data (characteristic correcting data) for correcting total output gray levels corresponding to each of a plurality of steps into which input gray levels are divided is inputted for each step. The number of steps into which input gray levels are divided can be freely set in accordance with the correction precision. In this example, it is assumed that input gray levels are divided into 10 steps as shown in Table 2. For example, if characteristic correcting data is +20, total output gray levels after correction corresponding to respective input gray levels in the step become total gray levels in the original characteristics corresponding to input gray levels obtained by respectively adding 20 to the input gray levels in the step.

TABLE 2

| STEP | INPUT GRAY LEVEL | CHARACTERISTICS CORRECTING DATA |
| --- | --- | --- |
| 1 | 0~25 | +20 |
| 2 | 26~50 | +10 |
| 3 | 51~75 | +5 |
| 4 | 76~100 | ±0 |
| 5 | 101~125 | -10 |
| 6 | 126~150 | -20 |
| 7 | 151~175 | -5 |
| 8 | 176~200 | ±0 |
| 9 | 201~225 | +10 |
| 10 | 226~255 | +5 |

Figure 9:
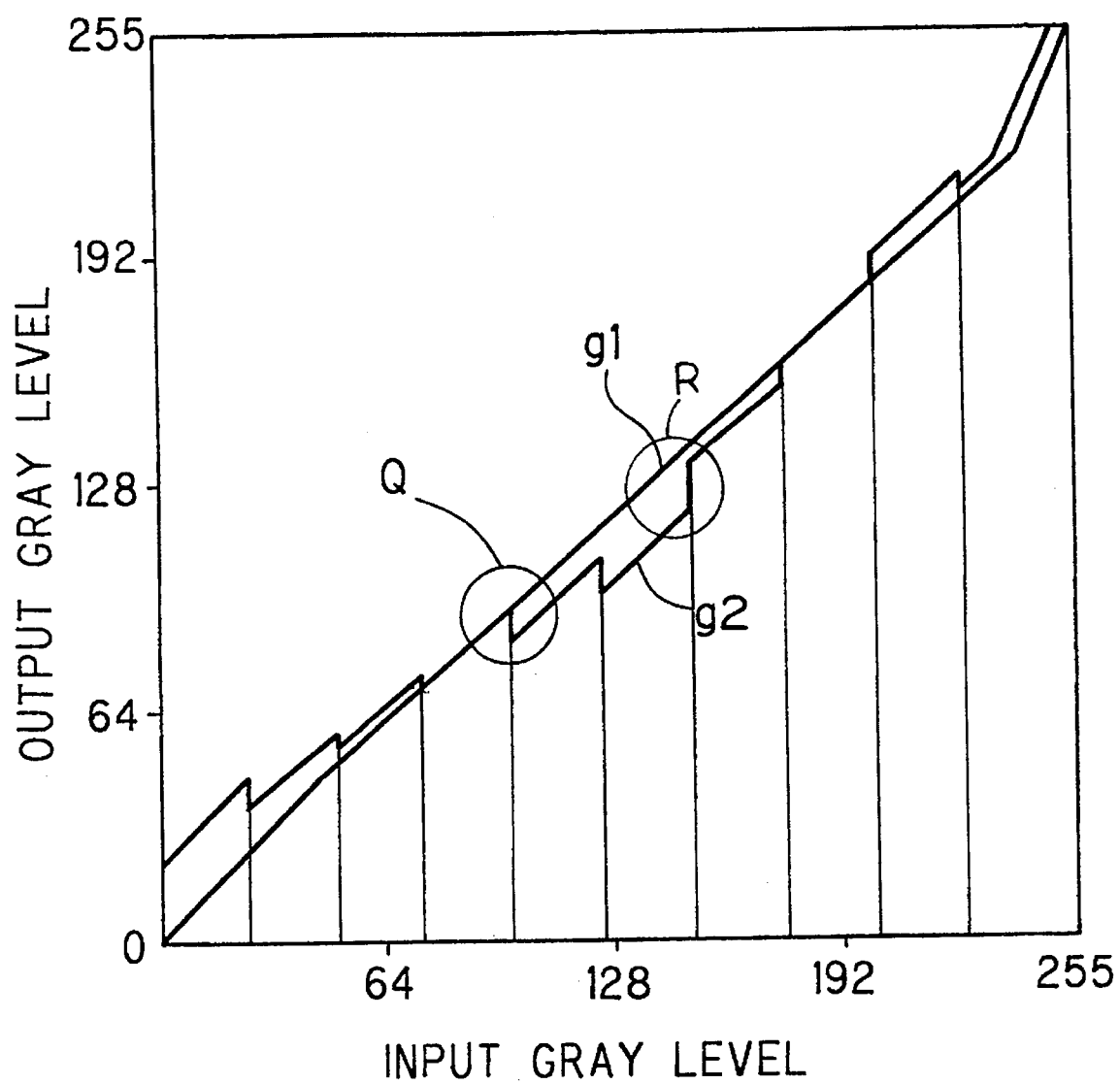
FIG. 9 is a graph showing input gray level-output gray level characteristic data obtained by correcting the input gray level-output gray level characteristic data shown in FIG. 8 on the basis of characteristic correcting data.

Characteristics after correction on the basis of the characteristic correcting data shown in the foregoing Table 2 are indicated by a graph line g2 in FIG. 9. In this example, the characteristics g2 after the correction in the first step are characteristics obtained by shifting a portion corresponding to the range of input gray levels 20 to 45 in the original characteristics g1 leftward by 20 input gray levels. Specifically, characteristics after the correction in each of the steps are equal to the original characteristics corresponding to input gray levels obtained by adding characteristic correcting data in the step to input gray levels in the step.

As can be seen from the characteristic graph line g2 representing the characteristics after the correction, there may, in some cases, occur at the boundary between adjacent steps such a reversal phenomenon that a total output gray level in the step having relatively high input gray levels is lower than a total output gray level in the step having relatively low input gray levels, as in a portion indicated by Q, for example. Consequently, an image becomes nonuniform, so that the reproducibility of the image is lowered. Such a reversal phenomenon occurs when characteristic correcting data corresponding to the step having relatively low input gray levels is larger than characteristic correcting data corresponding to the step having relatively high input gray levels out of the adjacent steps.

Figure 10:
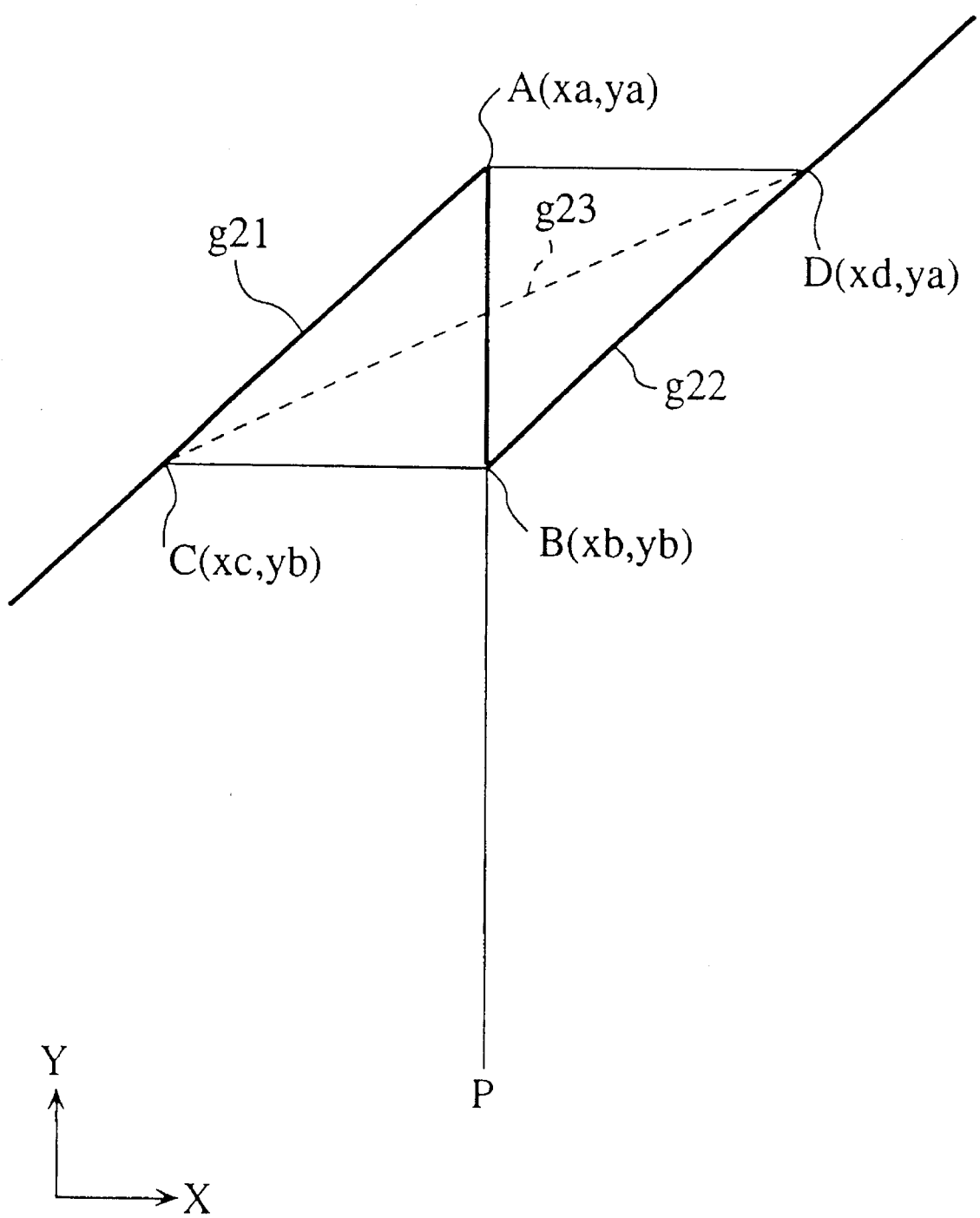
FIG. 10 is an illustration for explaining a method of correcting a reversal phenomenon using an enlarged view of a portion Q shown in FIG. 9.

When such a reversal phenomenon occurs, therefore, the reversal phenomenon is corrected in the following manner. FIG. 10 is an enlarged view of the portion Q shown in FIG. 9. Respective points on output gray level characteristics in FIG. 10 are represented by coordinate values in an X-Y coordinate system using input gray levels to enter the X axis and using output gray levels to enter the Y axis.

Coordinate data (xa, ya) of a point A at which a boundary line P between adjacent steps at which a reversal phenomenon occurs and a total output gray level characteristic line g21 corresponding to the step having relatively low input gray levels cross each other is found. On the other hand, coordinate data (xb, ya) of a point B at which the boundary line P between the adjacent steps at which the reversal phenomenon occurs and a total output gray level characteristic line g22 corresponding to the step having relatively high input gray levels cross each other is found.

X coordinate data xc of a point C at which the Y-coordinate is yb on the total output gray level characteristic line g21 corresponding to the step having relatively low input gray levels is then found. X coordinate data xd of a point D at which the Y-coordinate is ya on the total output gray level characteristic line g22 corresponding to the step having relatively high input gray levels is then found.

A straight line g23 connecting the points C and D is found from the coordinates (xc, yb) at the point C and the coordinates (xd, ya) at the point D. Characteristics from the point C to the point D are changed to characteristics represented by the straight line g23. Consequently, the reversal phenomenon is corrected. If the reversal phenomenon is corrected, such characteristics that output gray levels gradually increase with higher input gray levels in the vicinity of the boundary between the adjacent steps at which the reversal phenomenon occurs are obtained, thereby to improve gray level reproducibility.

As can be seen from the characteristic graph line g2 shown in FIG. 9, there may, in some cases, occur at the boundary between adjacent steps such a jump-up phenomenon that a total output gray level in the step having relatively low input gray levels rapidly increases to a total output gray level in the step having relatively high input gray levels, as in a portion indicated by R, for example. Consequently, a pseudo contour is produced, and the reproducibility of gray levels is lowered. Such a jump-up phenomenon occurs when characteristic correcting data corresponding to the step having relatively low input gray levels out of the adjacent steps is smaller than characteristic correcting data corresponding to the step having relatively high input gray levels.

Figure 11:
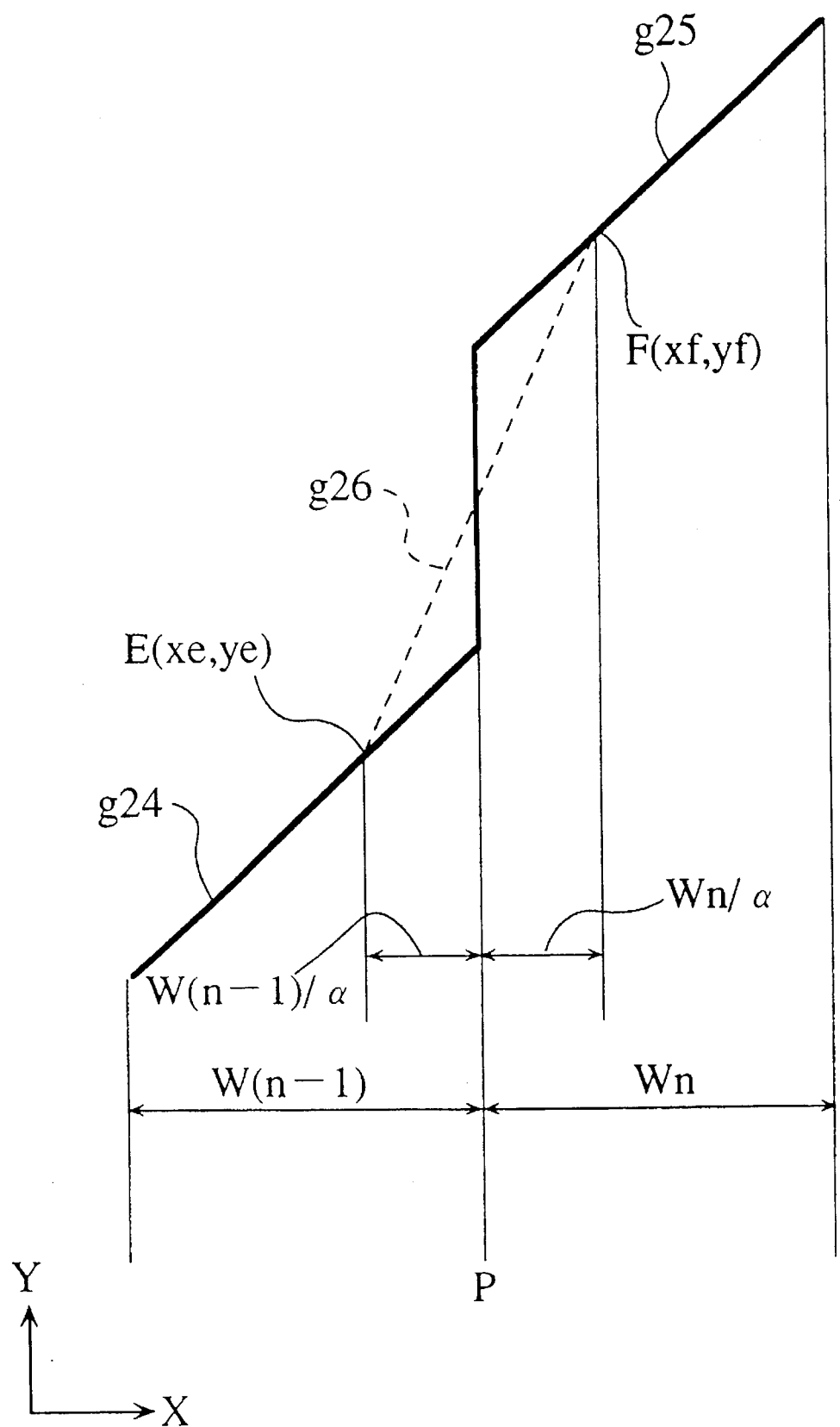
FIG. 11 is an illustration for explaining a method of correcting a jump-up phenomenon using an enlarged view of a portion R shown in FIG. 9.

When such a jump-up phenomenon occurs, therefore, the jump-up phenomenon is corrected in the following manner. FIG. 11 is an enlarged view of the portion R shown in FIG. 9. Respective points on output gray level characteristics in FIG. 11 are represented by coordinate values in an X-Y coordinate system using input gray levels to enter the X axis and using output gray levels to enter the Y axis.

In FIG. 11, a boundary line between adjacent steps at which a jump-up phenomenon occurs is indicated by P. A level width W (n-1) of the step having relatively low input gray levels and a level width Wn of the step having relatively high input gray levels out of the adjacent steps at which a jump-up phenomenon occurs are first found.

Coordinate data E (xe, ye) of a point E spaced apart from the boundary line P by a length $\{W(n-1)/\alpha\}$ in a direction of -X on a total output gray level characteristic line g24 corresponding to the step having relatively low input gray levels are then found, where a is a value larger than one previously set, which is set to three in this example.

Furthermore, coordinate data F (xf, yf) of a point F spaced apart from the boundary line P by a length $(Wn/\alpha)$ in a direction of +X on a total output gray level characteristic line g25 corresponding to the step having relatively high input gray levels are found, where $\alpha$ is a value larger than one previously set, which is set to three in this example.

A straight line g26 connecting the points E and F is found from the coordinates (xe, ye) at the point E and the coordinates (xf, yf) at the point F. Characteristics from the point E to the point F are changed to characteristics represented by the straight line g26. Consequently, the jump-up phenomenon is corrected. If the jump-up phenomenon is thus corrected, such characteristics that output gray levels gradually increase with higher input gray levels are obtained in the vicinity of the boundary between the adjacent steps at which the jump-up phenomenon occurs, whereby no pseudo contour occurs, and gray level reproducibility is improved.

Description is now made of an operation of the copying machine for correcting input gray level-output gray level characteristic data as described above.

Referring to FIG. 4, an address specifying signal corresponding to a pixel in the dither matrix which corresponds to input gray level data and a pixel position signal is outputted from the address generating circuit 101. The CPU 20 reads out input gray level-output gray level characteristic data corresponding to a developing color, the designated copy density and the designated type of document image from the ROM 21 and transfers the data to the RAM 22.

Input gray level-output gray level characteristic data stored in the RAM 22 are corrected on the basis of characteristic correcting data inputted by the operation display section 24 and stored in the back-up RAM 23. If the reversal phenomenon occurs in input gray level-output gray level characteristic data after the correction, data in a portion where the reversal phenomenon occurs is corrected by the above described reversal phenomenon correcting method. On the other hand, if the jump-up phenomenon occurs in the input gray level-output gray level characteristic data after the correction, data in a portion where the jump-up phenomenon occurs is corrected by the above described jump-up phenomenon correcting method.

Data which are subjected to the reversal phenomenon correction and the jump-up phenomenon correction by the characteristic correcting data are transferred to the table memory 102.

If all the input gray level-output gray level characteristic data are thus sent to the table memory 102 from the RAM 22, after which the address specifying signal corresponding to the input gray level data and the pixel position signal is outputted from the address generating circuit 101, data corresponding to a designated address is outputted from the table memory 102.

A table memory having a capacity capable of storing four types of input gray level-output gray level characteristic data corresponding to four developing colors may be used as the table memory 102, and the input gray level-output gray level characteristic data corresponding to the four developing colors which correspond to the type of the document image out of the plurality of types of input gray level-output gray level characteristic data stored in the ROM 21 may be transferred. In this case, a signal representing a developing color is sent to the address generating circuit 101 from the CPU 20, so that a 12-bit address specifying signal including the signal representing a developing color is outputted from the address generating circuit 101.

Figure 12:
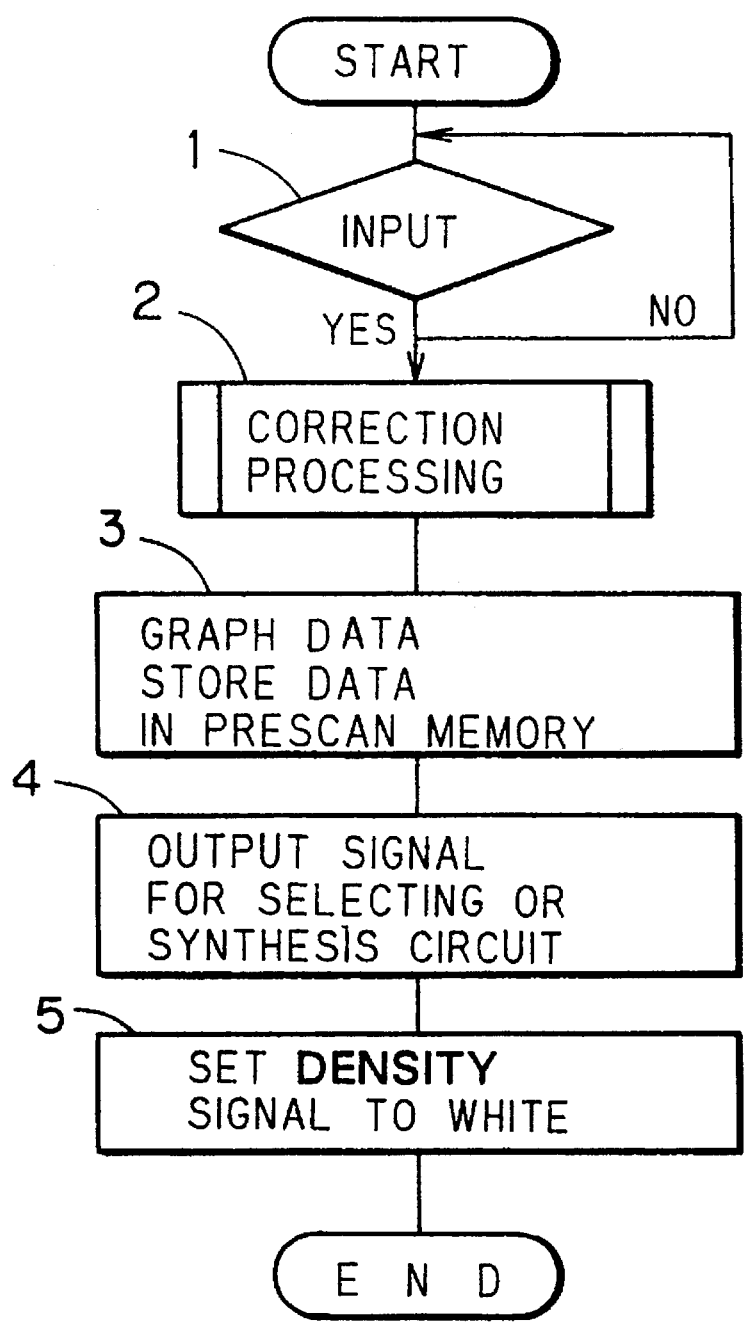
FIG. 12 is a flow chart showing the procedure for processing performed by a CPU 20 for graphing input gray level-output gray level characteristic data after the correction and generating a graph corresponding to the input gray level-output gray level characteristic data.

FIG. 12 shows the procedure for processing performed by the CPU 20 in a case where input gray level-output gray level characteristic data obtained by correction on the basis of the characteristic correcting data are graphed, and a graph corresponding to the input gray level-output gray level characteristic data is generated.

An operator selects a characteristic graph output mode from the operation display section 24 and inputs the mode. Further, the operator inputs a developing color, the copy density and the type of document image so as to select input gray level-output gray level characteristic data which is the basis of input gray level-output gray level characteristic data to be graphed.

When an input operation for graphing the input gray level-output gray level characteristic data is performed (step 1), correction processing of the input gray level-output gray level characteristic data is performed (step 2). Specifically, input gray level-output gray level characteristic data corresponding to the developing color, the copy density and the type of document image inputted are read from the ROM 21 shown in FIG. 4 and transferred to the RAM 22, and the input gray level-output gray level data is corrected on the basis of characteristic correcting data stored in the backup RAM 23. In addition, the reversal phenomenon correction and jump-up phenomenon correction are made.

The input gray level-output gray level characteristic data after the correction are transferred to the table memory 102.

When the input gray level-output gray level characteristic data after the correction are stored in the table memory 102, the input gray level-output gray level characteristic data are read out of the table memory 102, and binary data representing a graph line corresponding to the input gray level-output gray level characteristic data after the correction read out is bit-map developed into the prescan memory 83 shown in FIG. 2 (step 3). Specifically, a point on the graph line corresponding to the input gray level-output gray level characteristic data after the correction is indicated by black data "1", and the other portion thereon is indicated by white data "0".

A control signal Se for selecting an output of the OR synthesis circuit 92 is then sent to the selector 93 in the synthesis processing section 9 shown in FIG. 3 (step 4). In addition, white data is so set in the BK producing section 6 that an output of the BK producing section 6 becomes a signal representing a white color (step 5). Consequently, the value of a density signal Sd inputted to the synthesis processing section 9 becomes "0" representing a white color.

Thereafter, when a print start key provided for the operation display section 24 is pressed by the operator, the binary data representing the graph line corresponding to the input gray level-output gray level characteristic data after the conversion is read out of the prescan memory 83 and sent to the synthesis processing section 9. In the OR synthesis circuit 92 in the synthesis processing section 9, the maximum density value is outputted when the binary data Sp read out of the prescan memory 83 is "1", while the density signal Sd representing a white color ("0") is outputted when the binary data Sp is "0".

The output of the OR synthesis circuit 92 is sent to the printer section 12 through the selector 93, the density processing section 10 and the variable magnification and movement processing section 11, to accomplish recording on paper. Consequently, the input gray level-output gray level characteristic data after the correction are graphed and outputted.

The original input gray level-output gray level characteristic data stored in the ROM 21 are read out, and binary data representing a graph line corresponding to the original input gray level-output gray level characteristic data is stored in the prescan memory 83, thereby to make it possible to graph the original input gray level-output gray level data and generate a graph corresponding to the input gray level-output gray level characteristic data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:

first storing means for storing input gray level-output gray level characteristic data which represent an output gray level relative to an input gray level;

a density processing section which receives input gray level-output gray level characteristic data from said first storing means, said density processing section including second storing means for storing input gray level-output gray level characteristic data transferred from said first storing means, and address generating means for generating addresses corresponding to said second storing means in response to input gray level data, said second storing means and said address generating means cooperating to supply output gray level data from an address in said second storing means when said address is specified by said address generating means;

inputting means for inputting characteristic correcting data, said characteristic correcting data providing input gray level-output gray level corrections corresponding to a plurality of division steps into which input gray levels are divided;

correcting means for correcting input gray level-output gray level characteristic data stored in said first storing means on the basis of characteristic correcting data supplied by said inputting means; and reversal phenomenon correcting means for correcting, when there occurs at the boundary between adjacent steps such a reversal phenomenon that an output gray level in the step having relatively low input gray levels is higher than an output gray level in the step having relatively high input gray levels in input gray level-output gray level characteristic data obtained by the correction using said correcting means, said input gray level-output gray level characteristic data so that output gray levels gradually increase with higher input gray levels in the vicinity of the boundary, said reversal phenomenon correcting means including means for finding data of a point A at which a boundary line between the adjacent steps at which the reversal phenomenon occurs and a total output gray level characteristic line corresponding to the step having relatively low input gray levels which is represented by said input gray level-output gray level characteristic data obtained by the correction using the correcting means cross each other, means for finding data of a point B at which the boundary line between the adjacent steps at which the reversal phenomenon occurs and a total output gray level characteristic line corresponding to the step having relatively high input gray levels which is represented by said input gray level-output gray level characteristic data obtained by the correction using the correcting means cross each other, finding a point C having an output gray level equal to the output gray level of said point B on the total output gray level characteristic line corresponding to the step having relatively low input gray levels which is represented by said input gray level-output gray level characteristic data obtained by the correction using the correcting means, finding a point D having an output gray level equal to the output gray level of said point A on the total output gray level characteristic line corresponding to the step having relatively high input gray levels which is represented by said input gray level-output gray level characteristic data obtained by the correction using the correcting means, and means for finding a found straight line connecting said point C and said point D and changing the input gray level-output gray level characteristic data between the point C and the point D to characteristics represented by the found straight line.

2. The image forming apparatus according to claim 1, further including:

means for graphing, when the reversal phenomenon occurs in the input gray level-output gray level characteristic data by and after the correction using the correcting means, input gray level-output gray level characteristic data after correcting said reversal phenomenon by said reversal phenomenon correcting means and generating a graph corresponding to the input gray level-output gray level characteristic data.

3. An image forming apparatus comprising:

first storing means for storing input gray level-output gray level characteristic data which represent an output gray level relative to an input gray level;

a density processing section which receives input gray level-output gray level characteristic data from said first storing means, said density processing section including second storing means for storing input gray level-output gray level characteristic data transferred from said first storing means, and address generating means for generating addresses corresponding to said second storing means in response to input gray level data, said second storing means and said address generating means cooperating to supply output gray level data from an address in said second storing means when said address is specified by said address generating means;

inputting means for inputting characteristic correcting data, said characteristic correcting data providing input gray level-output gray level corrections corresponding to a plurality of division steps into which input gray levels are divided;

correcting means for correcting input gray level-output gray level characteristic data stored in said first storing means on the basis of characteristic correcting data supplied by said inputting means; and jump-up phenomenon correcting means for correcting, when there occurs at the boundary between adjacent steps such a jump-up phenomenon that an output gray level in the step having relatively low input gray levels rapidly increases to an output gray level in the step having relatively high input gray levels in input gray level-output gray level characteristic data obtained by the correction using said correcting means, said input gray level-output gray level characteristic data so that output gray levels gradually increase with higher input gray levels in the vicinity of the boundary.

4. The image forming apparatus according to claim 3, wherein said jump-up correcting means comprises means for finding a level width of the step having relatively low input gray levels and a level width of the step having relatively high input gray levels out of the adjacent steps at which the jump-up phenomenon occurs, means for finding data of a point E spaced apart from a boundary line between the adjacent steps at which the jump-up phenomenon occurs by 1/α (where α is a value larger than one) of the level width of the step having relatively low input gray levels in the direction of input gray levels on a total output gray level characteristic line corresponding to the step having relatively low input gray levels which is represented by said input gray level-output gray level characteristic data obtained by the correction using the correcting means, means for finding data of a point F spaced apart from the boundary line between the adjacent steps at which the jump-up phenomenon occurs by 1/α (where α is a value larger than one) of the level width of the step having relatively high input gray levels in the direction of the input gray levels on a total output gray level characteristic line corresponding to the step having relatively high input gray levels which is represented by said input gray level-output gray level characteristic data obtained by the correction using the correcting means, and means for finding a straight line connecting said point E and said point F and changing the input gray level-output gray level characteristic data between the point E and the point F to characteristics represented by the found straight line.

5. The image forming apparatus according to claim 3, further including:

means for graphing, when the jump-up phenomenon occurs in the input gray level-output gray level characteristic data by and after the correction using the correcting means, input gray level-output gray level characteristic data after correcting said jump-up phenomenon by said jump-up phenomenon correcting means and generating a graph corresponding to the input gray level-output gray level characteristic data.

6. An image forming apparatus comprising:

first storing means for storing input gray level-output gray level characteristic data which represent an output gray level relative to an input gray level;

a density processing section which receives input gray level-output gray level characteristic data from said first storing means, said density processing section including second storing means for storing input gray level-output gray level characteristic data transferred from said first storing means, and address generating means for generating addresses corresponding to said second storing means in response to input gray level data, said second storing means and said address generating means cooperating to supply output gray level data from an address in said second storing means when said address is specified by said address generating means;

inputting means for inputting characteristic correcting data, said characteristic correcting data providing input gray level-output gray level corrections corresponding to a plurality of division steps into which input gray levels are divided;

correcting means for correcting the input gray level-output gray level characteristic data stored in said first storing means on the basis of characteristic correcting data supplied by said inputting means;

reversal phenomenon correcting means for correcting, when there occurs at the boundary between adjacent steps such a reversal phenomenon that an output gray level in the step having relatively low input gray levels is higher than an output gray level in the step having relatively high input gray levels in input gray level-output gray level characteristic data obtained by the correction using said correcting means, said input gray level-output gray level characteristic data so that output gray levels gradually increase with higher input gray levels in the vicinity of the boundary; and jump-up phenomenon correcting means for correcting, when there occurs at the boundary between adjacent steps such a jump-up phenomenon that an output gray level in the step having relatively low input gray levels rapidly increases to an output gray level in the step having relatively high input gray levels in input gray level-output gray level characteristic data obtained by the correction using said correcting means, said input gray level-output gray level characteristic data so that output gray levels gradually increase with higher input gray levels in the vicinity of the boundary.

7. The image forming apparatus according to claim 5, wherein said reversal phenomenon correcting means includes means for finding data of a point A at which a boundary line between the adjacent steps at which the reversal phenomenon occurs and a total output gray level characteristic line corresponding to the step having relatively low input gray levels which is represented by said input gray level-output gray level characteristic data obtained by the correction using the correcting means cross each other, means for finding data of a point B at which the boundary line between the adjacent steps at which the reversal phenomenon occurs and a total output gray level characteristic line corresponding to the step having relatively high input gray levels which is represented by said input gray level-output gray level characteristic data obtained by the correction using the correcting means cross each other, finding a point C having an output gray level equal to the output gray level of said point B on the total output gray level characteristic line corresponding to the step having relatively low input gray levels which is represented by said input gray level-output gray level characteristic data obtained by the correction using the correcting means, finding a point D having an output gray level equal to the output gray level of said point A on the total output gray level characteristic line corresponding to the step having relatively high input gray levels which is represented by said input gray level-output gray level characteristic data obtained by the correction using the correcting means, and means for finding a found straight line connecting said point C and said point D and changing the input gray level-output gray level characteristic data between the point C and the point D to characteristics represented by the found straight line, and said jump-up phenomenon correcting means includes means for finding a level width of the step having relatively low input gray levels and a level width of the step having relatively high input gray levels out of the adjacent steps at which the jump-up phenomenon occurs, means for finding data of a point E spaced apart from a boundary line between the adjacent steps at which the jump-up phenomenon occurs by $1/\alpha$ (where $\alpha$ is a value larger than one) of the level width of the step having relatively low input gray levels in the direction of input gray levels on a total output gray level characteristic line corresponding to the step having relatively low input gray levels which is represented by said input gray level-output gray level characteristic data obtained by the correction using the correcting means, means for finding data of a point F spaced apart from the boundary line between the adjacent steps at which the jump-up phenomenon occurs by $1\alpha$ (where $\alpha$ is a value larger than one) of the level width of the step having relatively high input gray levels in the direction of the input gray levels on a total output gray level characteristic line corresponding to the step having relatively high input gray levels which is represented by said input gray level-output gray level characteristic data obtained by the correction using the correcting means, and means for finding a straight line connecting said point E and said point F and changing the input gray level-output gray level characteristic data between the point E and the point F to characteristics represented by the found straight line.

8. The image forming apparatus according to claim 6, further including:

means for respectively graphing, when the reversal phenomenon occurs and the jump-up phenomenon occurs in the input gray level-output gray level characteristic data by and after the correction using the correcting means, input gray level-output gray level characteristic data after correcting said reversal phenomenon by said reversal phenomenon correcting means and correcting said jump-up phenomenon by said jump-up phenomenon correcting means and generating graphs corresponding to the input gray level-output gray level characteristic data.

* * * * *